(12) United States Patent  (10) Patent No.: US 12,535,590 B2
Parian et al.  (45) Date of Patent: Jan. 27, 2026

(54) THREE DIMENSIONAL MEASUREMENT DEVICE HAVING A CAMERA WITH A FISHEYE LENS

(71) Applicant: FARO Technologies, Inc., Lake Mary, FL (US)

(72) Inventors: Jafar Amiri Parian, Schlieren (CH); Daniel Flohr, Stuttgart (DE); Martin Ossig, Tamm (DE); Andreas Woloschyn, Stuttgart (DE); Yazid Tohme, West Chester, PA (US)

(73) Assignee: FARO Technologies, Inc., Lake Mary, FL (US)

( * ) Notice: Subject to any disclaimer, the term of this patent is extended or adjusted under 35 U.S.C. 154(b) by 1103 days.

(21) Appl. No.: 17/451,946

(22) Filed: Oct. 22, 2021

(65) Prior Publication Data
US 2022/0137225 A1 May 5, 2022

Related U.S. Application Data

(60) Provisional application No. 63/108,541, filed on Nov. 2, 2020.

(51) Int. Cl.
*G01S 17/894* (2020.01)
*G01S 7/481* (2006.01)
(Continued)

(52) U.S. Cl.
CPC .......... *G01S 17/894* (2020.01); *G01S 7/4817* (2013.01); *G01S 17/86* (2020.01); *G02B 13/06* (2013.01)

(58) Field of Classification Search
CPC ...... G01S 17/894; G01S 7/4817; G01S 17/86; G01S 7/4808; G01S 7/4813; G01S 17/66; G01S 17/89; G01S 17/42; G02B 13/06
(Continued)

(56) References Cited

U.S. PATENT DOCUMENTS 8,384,914 B2 2/2013 Becker et al.
8,619,265 B2 12/2013 Steffey et al.
(Continued)

FOREIGN PATENT DOCUMENTS

EP 3955020 A1 2/2022
JP 2020003484 A 1/2020

OTHER PUBLICATIONS

Abstract of Sugihara et al., JP2020003484, created Mar. 15, 2025, 1 page. (Year: 2025).*
(Continued)

*Primary Examiner* — Daniel L Murphy
(74) *Attorney, Agent, or Firm* — McCarter & English, LLP; Dave S. Christensen

(57) ABSTRACT

A 3D measurement system, a laser scanner and a measurement device are provided. The system includes a 3D measurement device and a 360 degree image acquisition system coupled in a fixed relationship to the 3D measurement device. The 360 degree image acquisition system includes a first photosensitive array operably coupled to a first lens, the first lens having a first optical axis in a first direction, the first lens being configured to provide a first field of view greater than 180 degrees. The image acquisition system further includes a second photosensitive array operably coupled to a second lens, the second lens having a second optical axis in a second direction, the second direction is opposite the first direction, the second lens being configured to provide a second field of view greater than 180 degrees. Wherein the first field of view at least partially overlaps with the second field of view.

20 Claims, 13 Drawing Sheets

(51) Int. Cl.
*G01S 17/86* (2020.01)
*G02B 13/06* (2006.01)

(58) Field of Classification Search
USPC ........................................................ 356/4.01
See application file for complete search history.

(56) References Cited

U.S. PATENT DOCUMENTS

| | | |
|---|---|---|
| 8,724,120 B2 | 5/2014 | Steffey et al. |
| 9,007,601 B2 | 4/2015 | Steffey et al. |
| 9,074,878 B2 | 7/2015 | Steffey et al. |
| 9,146,094 B2 | 9/2015 | Steffey et al. |
| 9,599,715 B2 | 3/2017 | Becker et al. |
| 9,689,972 B2 | 6/2017 | Becker et al. |
| 9,910,126 B2 | 3/2018 | Bridges et al. |
| 10,455,216 B2 | 10/2019 | Raab et al. |
| 10,782,118 B2 | 9/2020 | Smith |
| 2010/0134596 A1 | 6/2010 | Becker |
| 2012/0070077 A1 | 3/2012 | Ossig et al. |
| 2017/0254884 A1 | 9/2017 | Becker et al. |
| 2018/0095174 A1 | 4/2018 | Mertz et al. |
| 2019/0154806 A1 | 5/2019 | Zweigle et al. |
| 2019/0156568 A1 | 5/2019 | Frank |
| 2019/0335160 A1 | 10/2019 | Ramadneh et al. |
| 2019/0339391 A1 | 11/2019 | Santos et al. |
| 2020/0018869 A1 | 1/2020 | Ossig |
| 2020/0249357 A1 | 8/2020 | Becker et al. |
| 2020/0301885 A1 | 9/2020 | Zweigle et al. |
| 2020/0320295 A1 | 10/2020 | Wohlfeld |

OTHER PUBLICATIONS

Claims of Sugihara et al., JP2020003484, created Mar. 15, 2025, 6 pages. (Year: 2025).*
Description of Sugihara et al., JP2020003484, created Mar. 15, 2025, 74 pages (Year: 2025).*
Eng, "Leica Absolite Distance Meter," 28 pages (Year: 2002).*
Castanheiro, L.F., et al., "3D Reconstruction of Citrus Trees Using an Omnidirectional Optical System", 2020 IEEE Latin American GRSS & ISPRS Remote Sensing Conference (LAGIRS), IEEE, Mar. 22, 2020 (Mar. 22, 2020), pp. 409-414, XP033810553.
European Search Report for Application No. 21204687.4 dated Mar. 24, 2022; 42 pgs.

* cited by examiner

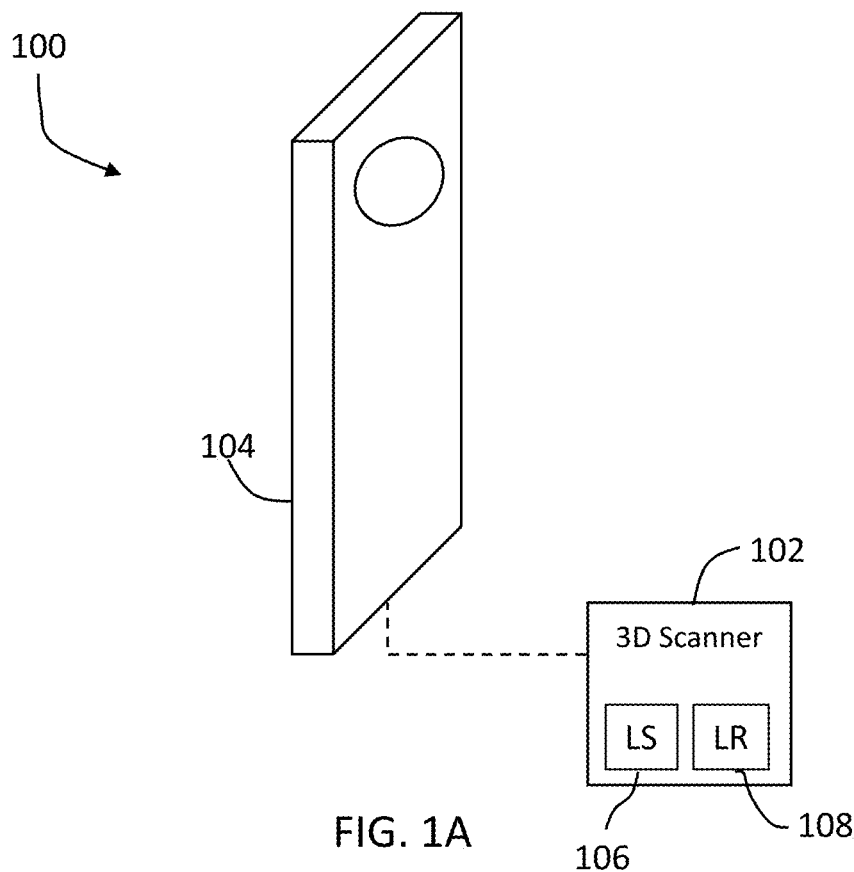
FIG. 1A
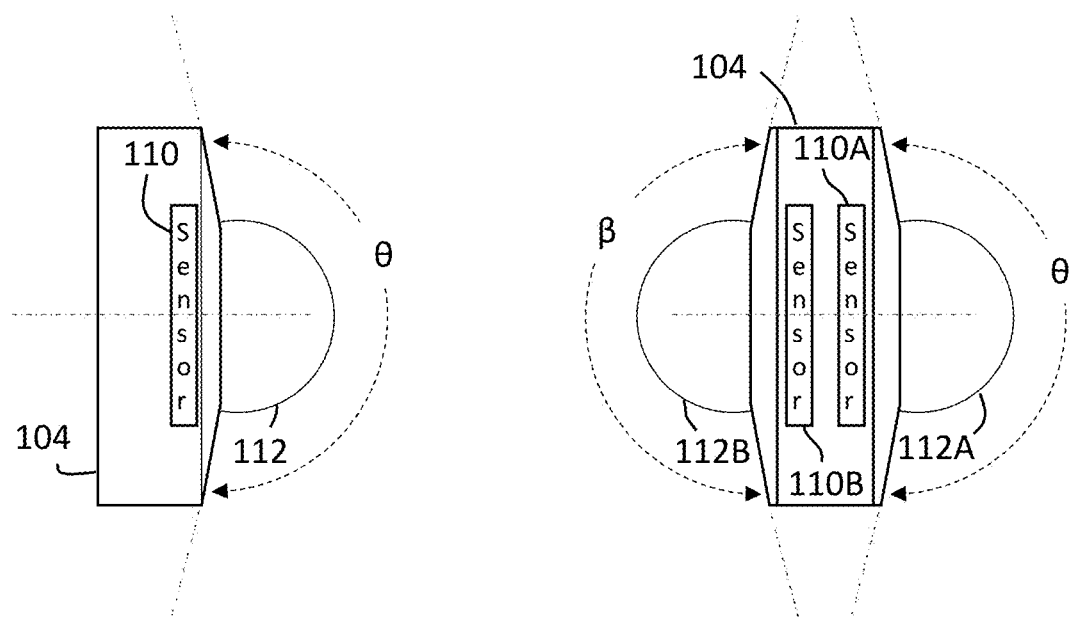
FIG. 1B
FIG. 1C

THREE DIMENSIONAL MEASUREMENT DEVICE HAVING A CAMERA WITH A FISHEYE LENS

CROSS-REFERENCE TO RELATED APPLICATIONS

The present application is a nonprovisional application of, and claims the benefit of, U.S. Provisional Application 63/108,541 filed on Nov. 2, 2020, the contents of which is incorporated by reference herein in its entirety.

BACKGROUND

The subject matter disclosed herein relates to a three dimensional measurement device, and in particular to a three dimensional measurement device that includes a camera.

Metrology devices that measure three-dimensional coordinates of an environment often use an optical process for acquiring coordinates of surfaces. Metrology devices of this category include, but are not limited to time-of-flight (TOF) laser scanners, laser trackers, laser line probes, photogrammetry devices, triangulation scanners, structured light scanners, or systems that use a combination of the foregoing. Typically, these devices include a two-dimensional (2D) camera to acquire images, either before, during or after the acquisition of three-dimensional coordinates (commonly referred to as scanning). The 2D camera acquires a 2D image, meaning an image that lacks depth information.

Three-dimensional measurement devices use the 2D image for a variety of functions. These can include colorizing a collection of three-dimensional coordinates, sometimes referred to as a point cloud, performing supplemental coordinate measurements (e.g. photogrammetry), identify features or recognize objects in the environment, register the point cloud, and the like. Since these 2D cameras have a narrow field of view relative to the volume being scanned or the field of operation, many images are acquired to obtain the desired information. It should be appreciated that this acquisition of 2D images and the subsequent merging of this information adds to the amount of time to complete the scan of the environment.

Accordingly while existing cameras are suitable for their intended purposes, the need for improvement remains particularly in reducing the amount of time to complete a scanning operation.

BRIEF DESCRIPTION

According to one aspect of the disclosure a 3D measurement system is provided. The system includes a 3D measurement device and a 360 degree image acquisition system coupled in a fixed relationship to the 3D measurement device. The 360 degree image acquisition system includes a first photosensitive array operably coupled to a first lens, the first lens having a first optical axis in a first direction, the first lens being configured to provide a first field of view greater than 180 degrees. The image acquisition system further includes a second photosensitive array operably coupled to a second lens, the second lens having a second optical axis in a second direction, the second direction is opposite the first direction, the second lens being configured to provide a second field of view greater than 180 degrees. Wherein the first field of view at least partially overlaps with the second field of view.

In addition to one or more of the features described herein, or as an alternative, further embodiments of the system may include the first optical axis and second optical axis being arranged coaxial. In addition to one or more of the features described herein, or as an alternative, further embodiments of the system may include the first photosensitive array being positioned adjacent the second photosensitive array. In addition to one or more of the features described herein, or as an alternative, further embodiments of the system may include the 360 degree image acquisition system extending from a top portion of the 3D measurement system. In addition to one or more of the features described herein, or as an alternative, further embodiments of the system may include the first lens is arranged at least partially on a first projecting extending from a first side of the 3D measurement system, the second lens being at least partially arranged on a second projection extending from a second side of the 3D measurement system.

In addition to one or more of the features described herein, or as an alternative, further embodiments of the system may include a mobile platform, the 3D measurement device being mounted on the mobile platform. In addition to one or more of the features described herein, or as an alternative, further embodiments of the system may include the mobile platform being manually movable. In addition to one or more of the features described herein, or as an alternative, further embodiments of the system may include the mobile platform being at least semi-autonomous.

According to one aspect of the disclosure a laser scanner is provided. The laser scanner comprising a housing and a light emitter and a light receiver disposed within the housing. A beam steering device is operably coupled to the housing and disposed to reflect light received from the light emitter and direct reflected light received from the environment onto the light receiver. A first angular transducer is provided that measures a first angle of rotation of the housing about a first axis. A second angular transducer is provided that measures a second angle of rotation of the beam steering device about a second axis. An image acquisition system is operably coupled to the housing. The image acquisition system includes a first photosensitive array operably coupled to a first lens, the first lens having a first optical axis in a first direction, the first lens being configured to provide a first field of view greater than 180 degrees about the housing. The image acquisition system further includes a second photosensitive array operably coupled to a second lens, the second lens having a second optical axis in a second direction, the second direction is opposite the first direction, the second lens being configured to provide a second field of view greater than 180 degrees about the housing. Wherein the first field of view is at least partially overlaps with the second field of view.

In addition to one or more of the features described herein, or as an alternative, further embodiments of the laser scanner may include the image acquisition system extending from a top portion of the housing. In addition to one or more of the features described herein, or as an alternative, further embodiments of the laser scanner may include the first lens being arranged at least partially on a first projecting extending from a first side of the housing, the second lens being at least partially arranged on a second projection extending from a second side of the housing. In addition to one or more of the features described herein, or as an alternative, further embodiments of the laser scanner may include the 3D device has a distance meter.

In addition to one or more of the features described herein, or as an alternative, further embodiments of the laser scanner may include the image acquisition system being mounted on a top portion of the housing. In addition to one or more of the features described herein, or as an alternative, further embodiments of the laser scanner may include a mobile platform, the housing being mounted on the mobile platform. In addition to one or more of the features described herein, or as an alternative, further embodiments of the laser scanner may include a second coordinate measurement device configured to measure three-dimensional coordinates in a volume about the second coordinate measurement device.

In addition to one or more of the features described herein, or as an alternative, further embodiments of the laser scanner may include the mobile platform having a structure that extends in a direction away from a surface that the mobile platform is located, the first coordinate measurement device being mounted to an end of the structure. In addition to one or more of the features described herein, or as an alternative, further embodiments of the laser scanner may include the image acquisition system being mounted on a top portion of the housing. In addition to one or more of the features described herein, or as an alternative, further embodiments of the laser scanner may include the image acquisition system being operably mounted to the structure. In addition to one or more of the features described herein, or as an alternative, further embodiments of the laser scanner may include the image acquisition system being mounted to the structure by a bracket, the bracket being shaped to position the image acquisition system adjacent a top portion of the housing.

In addition to one or more of the features described herein, or as an alternative, further embodiments of the laser scanner may include a second image acquisition system being disposed on the second coordinate measurement device. The second image acquisition system may include a first photosensitive array operably coupled to a first lens, the first lens having a first optical axis in a first direction, the first lens being configured to provide a first field of view greater than 180 degrees about the housing. The second image acquisition system may further include a second photosensitive array operably coupled to a second lens, the second lens having a second optical axis in a second direction, the second direction is opposite the first direction, the second lens being configured to provide a second field of view greater than 180 degrees about the housing. Wherein the first field of view is at least partially overlaps with the second field of view.

In addition to one or more of the features described herein, or as an alternative, further embodiments of the laser scanner may include one or more processors operably coupled to the first coordinate measurement device and the image acquisition system, the one or more processors being configured to register three-dimensional coordinate data acquired by the first coordinate measurement device at different time into a common coordinate frame of reference based at least in part on images acquired by the image acquisition system.

According to one aspect of the disclosure a laser tracking measuring device is provided. The device includes a housing and a structure rotationally coupled the housing to rotate about a first axis and a second axis. A light source, an absolute distance meter, a tracking system, and a first camera are operably coupled to the structure, the light source producing a first light beam that cooperates with the absolute distance meter, the tracking system configured to move the first light beam to a center of a retroreflector target, the first camera including a first lens system and a first photosensitive array. A first angular transducer is provided that measures a first angle of rotation of the structure about the first axis. A second angular transducer is provided that measures a second angle of rotation of the structure about the second axis. An image acquisition system is operably coupled to the housing. The image acquisition system includes a first photosensitive array operably coupled to a first lens, the first lens having a first optical axis in a first direction, the first lens being configured to provide a first field of view greater than 180 degrees about the housing. The image acquisition system further includes a second photosensitive array operably coupled to a second lens, the second lens having a second optical axis in a second direction, the second direction is opposite the first direction, the second lens being configured to provide a second field of view greater than 180 degrees about the housing. Wherein the first field of view at least partially overlaps with the second field of view.

In addition to one or more of the features described herein, or as an alternative, further embodiments of the device may include the structure having a payload portion and a yoke portion, the yoke portion being rotatably coupled to the housing to rotate about the first axis, the payload being rotatably coupled to the yoke portion to rotate about the second axis, the image acquisition system being coupled to the yoke portion. In addition to one or more of the features described herein, or as an alternative, further embodiments of the device may include the image acquisition system extending from a top portion of the yoke portion. In addition to one or more of the features described herein, or as an alternative, further embodiments of the device may include the first lens and the second lens being arranged on opposing sides of the yoke portion.

In addition to one or more of the features described herein, or as an alternative, further embodiments of the device may include the first lens and the second lens being coupled to the housing. In addition to one or more of the features described herein, or as an alternative, further embodiments of the device may include one or more processors operably coupled to the first light source, the absolute distance meter, the tracking system, the first camera, the first angular transducer, the second angular transducer, and the image acquisition system, the one or more processors being operable to identify at least one retroreflector device in images acquired by the image acquisition system and cause the rotation of the payload to emit the first light beam towards the at least one retroreflector device.

In addition to one or more of the features described herein, or as an alternative, further embodiments of the device may include a display operably coupled to the one or more processors, the display being configured to display the images. Wherein the one or more processors are responsive to cause the rotation of the payload in response to an operator selecting the at least one retroreflector on the display.

In addition to one or more of the features described herein, or as an alternative, further embodiments of the device may include the one or more processors being further configured to detect a movement of the at least one retroreflector in the images and cause the rotation of the payload to direct the first light beam to follow the movement of the at least one retroreflector. In addition to one or more of the features described herein, or as an alternative, further embodiments of the device may include the one or more processors being further responsive to lock onto the at least one retroreflector in response to the at least one retroreflector being moved from a first position to a second position.

These and other advantages and features will become more apparent from the following description taken in conjunction with the drawings.

BRIEF DESCRIPTION OF DRAWINGS

FIG. 1A is a schematic image of a three-dimensional measurement device having a camera in accordance with an embodiment;

FIG. 1B is a schematic view of an omnidirectional camera for use with the three-dimensional measurement device of FIG. 1A in accordance with an embodiment;

FIG. 1C is a schematic view of an omnidirectional camera system with a dual camera for use with the three-dimensional measurement device of FIG. 1A;

FIG. 1D' and FIG. 1E' are images of the dual camera of FIG. 1C where each of the images has a field of view greater than 180 degrees;

Figure 1D:
FIG. 1D and FIG. 1E are images acquired by the dual camera of FIG. 1C.

The detailed description explains embodiments of the disclosure, together with advantages and features, by way of example with reference to the drawings.

DETAILED DESCRIPTION OF THE DISCLOSURE

Embodiments of the present disclosure provide for using an ultra-wide angle camera with a coordinate measurement device. Embodiments of the disclosure provide for using an image from the ultra-wide angle camera to enhance or increase the efficiency of the coordinate measurement device.

Referring now to FIGS. 1A-1C, an embodiment of an image acquisition system 100 for measuring coordinates, such as three-dimensional coordinates, in the environment. The system 100 includes a coordinate measurement device 102 having an ultra-wide angle camera 104. The coordinate measurement device 102 or scanner, includes a light source 106 and a light receiver 108. As discussed in more detail herein, the scanner 102 is configured to emit light from the light source 106 which is reflected off a surface in the environment and is received by the light receiver 108. In an embodiment, the light receiver 108 is a photosensitive array.

In an embodiment, the camera 104 includes a sensor 110 (FIG. 1B), that includes an array of photosensitive pixels. The sensor 110 is arranged to receive light from a lens 112. In the illustrated embodiment, the lens 112 is an ultra-wide angle lens that provides (in combination with the sensor 110) a field of view θ between 100 and 270 degrees. In an embodiment, the field of view θ is greater than 180 degrees and less than 270 degrees about a vertical axis (e.g. substantially perpendicular to the floor or surface that the measurement device is located). It should be appreciated that while embodiments herein describe the lens 112 as a single lens, this is for example purposes and the lens 112 may be a comprised of a plurality of optical elements.

In an embodiment, the camera 104 includes a pair of sensors 110A, 110B that are arranged to receive light from ultra-wide angle lenses 112A, 112B respectively (FIG. 1C). The sensor 110A and lens 112A are arranged to acquire images in a first direction and the sensor 110B and lens 112B are arranged to acquire images in a second direction. In the illustrated embodiment, the second direction is opposite the first direction (e.g. 180 degrees apart). A camera having opposingly arranged sensors and lenses with at least 180 degree field of view are sometimes referred to as an omnidirectional camera or a panoramic camera as it acquires an image in a 360 degree volume about the camera.

Figure 1E:
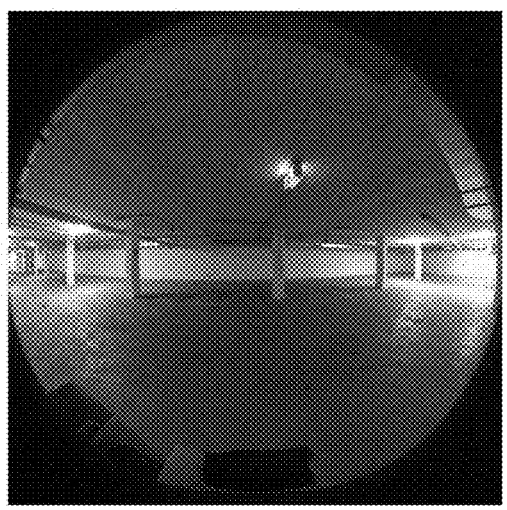
Figure 1D:
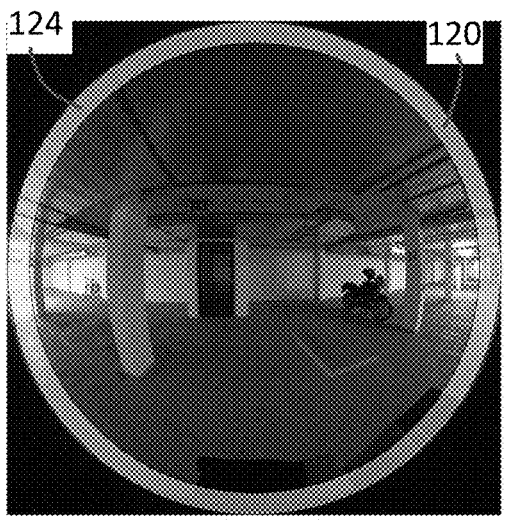
Figure 1E:
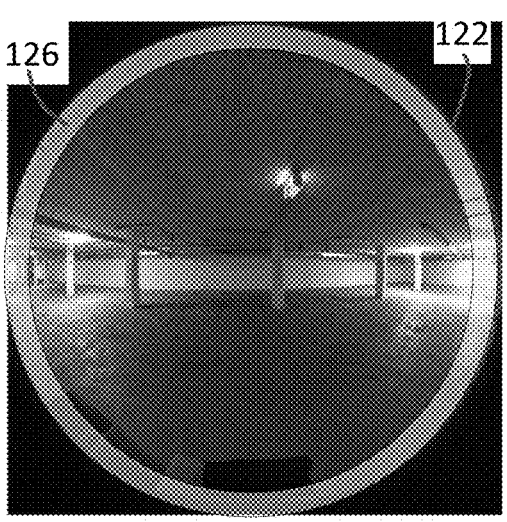
Figure 1F:
FIG. 1F is a merged image formed from the images of FIG. 1D and FIG. 1E in accordance with an embodiment.

It should be appreciated that when the field of view is greater than 180 degrees, there will be an overlap 120, 122 between the acquired images 124, 126 as shown in FIG. 1D' and FIG. 1E'. In some embodiments, the images may be combined to form a single image 128 of at least a substantial portion of the spherical volume about the camera 104 as shown in FIG. 1F.

Figure 2:
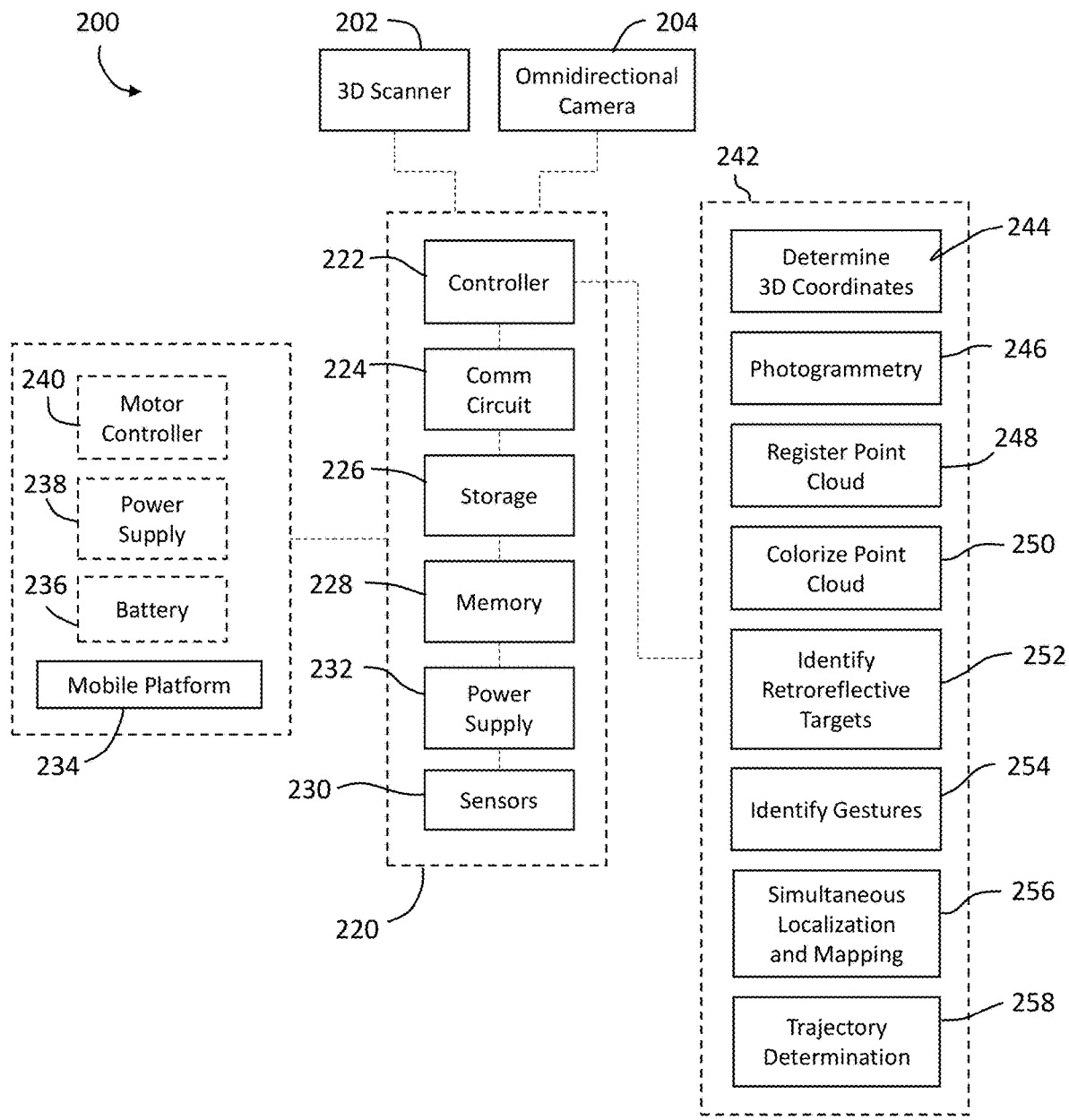
FIG. 2 is a schematic block diagram of the three-dimensional measurement device of FIG. 1A.

Referring now to FIG. 2, a schematic illustration of a system 200 is shown. In an embodiment, the system 200 is the same as the system 100 of FIG. 1A. In an embodiment, the system 200 includes a coordinate measurement device or scanner 202 and an image acquisition system or omnidirectional camera 204. It should be appreciated that while embodiments herein may refer to the scanner 202 as being a three-dimensional scanner, this is for example purposes and the claims should not be so limited. In other embodiments, the scanner 202 may be a two-dimensional scanner, meaning that coordinates are measured in a plane. In an embodiment, the omnidirectional camera 204 is integrally coupled to the scanner 202.

The scanner 202 and camera 204 are coupled to communicate with a control device 220. The control device 220 includes a controller 222 that provides for the operation of the system 200. In an embodiment, the controller 222 includes one or more processors that are responsive to executable computer instructions when executed on the one or more processors. It should be appreciated that the some of the processors may be located remotely from the control device and scanner 202. In an embodiment, the controller uses distributed computing with some of the processing being performed by one or more nodes in a cloud based computing environment. Controller 222 may accept instructions through user interface, such as but not limited to a keyboard, a mouse, or a touch screen for example.

The controller 222 is capable of converting signals representative of system data received from the scanner 202 and the camera 204. The system data may include distance measurements and encoder signals that may be combined to determine three-dimensional coordinates on surfaces in the environment. Other system data may include images or pixel voltages from the camera 204. In general the controller 222 accepts system data and is given certain instructions for the purpose of generating a 3D coordinate, registering a plurality of coordinate systems, applying color to points in the point cloud, identifying retroreflective targets, identifying gestures, simultaneously localizing and generating a map of the environment, or determining the trajectory of a measurement device.

The controller 222 also provides operating signals to scanner 202 and the camera 204. Additionally, the signals may initiate control methods that adapt the operation of the scanner 202, such as moving the scanner 202 or changing the direction of the emitted light, based at least in part on a signal received from the camera 204. For example, if the image acquired by the camera 204 is analyzed by the controller 222 and a retroreflective target (e.g. a light spot with a high optical power) is identified, control methods may be initiated in the scanner 202. In this case, the direction of the emitted light is adjusted or changed in order to be aligned to the direction of the retroreflective target.

The controller 222 is coupled to one or more system components by data transmission media (e.g. twisted pair wiring, coaxial cable, or fiber optical cable). Data transmission media includes, but is not limited to, wireless, radio, and infrared signal transmission systems. In the embodiment of FIG. 2, data transmission media couples to the controller 222 to scanner 202, camera 204, communications circuit 224, a storage device 226 (e.g. nonvolatile memory), memory 228 (e.g. random access memory or read-only memory), and other sensors 230.

The communications circuit 224 is operable to transmit and receive signals from external sources, including but not limited to nodes in a distributed or cloud-based computing environment. The communications circuit 224 may be configured to transmit and receive signals wirelessly (e.g. WiFi or Bluetooth), via a wired connection (e.g. Ethernet, Universal Serial Bus), or a combination thereof. Storage device 226 is any form of non-volatile memory such as an EPROM (Erasable Programmable Read Only Memory) chip, a disk drive, or the like. Stored in storage device 226 are various operational parameters for the application code.

In an embodiment, the sensors 230 may include an inertial measurement unit.

Controller 222 includes operation control methods embodied in application code, such as the methods described herein. These methods are embodied in computer instructions written to be executed by the one or more processors, typically in the form of software. The software can be encoded in any language. The controller 222 may further be electrically coupled to a power supply 232. The power supply 232 receives electrical power from a power source (e.g. a battery) and adapts the characteristics of the electrical power for use by the system 200.

In an embodiment, the system 200 may include an optional mobile platform 234. The mobile platform may be any movable assembly capable of supporting the scanner 202 and camera 204 during operation. As such, the mobile platform can have wheels or articulated legs. In one or more embodiments, the mobile platform may be, but is not limited to, a cart or a trolley for example. The mobile platform may include a handle positioned for an operator to push or pull the mobile platform through the environment where coordinates are to be acquired. In some embodiments, the mobile platform 234 may be autonomously or semi-autonomously operated. In this embodiment, the mobile platform 234 may include a power source/battery 236, a power supply 238 and a motor controller 240.

In an embodiment, the controller 22 is configured to execute one or more modules 242. In an embodiment, the modules 242 may be in the form of executable computer instructions that perform certain operational methods when executed on one or more processors. The modules 242 may be stored on storage 226 or memory 228 for example. The modules 242 when executed on the controller 222 may receive inputs, such as from the 3D scanner 202 and omnidirectional camera 204 and transform data, generate data, or cause the 3D scanner 202 or omnidirectional camera 204 to perform an action. In an embodiment, the modules 242 include one or more of, but not limited to, a determine 3D coordinates modules 244, a photogrammetry module 246, a register point cloud module 248, a colorize point cloud module 250, an identify retroreflective targets module 252, an identify gestures module 254, a simultaneous localization and mapping module 256, and a trajectory determination module 258.

In an embodiment, the colorize point cloud module aligns the images acquired by omnidirectional camera 204 with either the point cloud (from module 248) or with the 3D points from individual scans. In either case, once aligned, the color values from the images may be mapped to the points and the color value assigned to the point. In this way, when the point cloud is displayed in color, the image will appear realistic.

In an embodiment, the photogrammetry module 246 and the determine 3D coordinates module 244 may cooperate to determine 3D coordinates of points on surfaces in the environment using the omnidirectional camera 204. In an embodiment, the register point cloud module 248 may receive 3D coordinates from the module 244 and register them into the same coordinate frame of reference based at least in part on images acquired by the omnidirectional camera 204 during the operation of the 3D scanner 202.

In an embodiment, the identify retroreflective targets module 252 may be operated by flashing or illuminating a light source towards the environment and acquire an image by the omnidirectional camera 204. In the image, any retroreflective targets will appear as spots or bright areas within the environment. Using the location of these spots the controller 222 may direct the 3D scanner 202 to change the direction that it emits light (e.g. by rotating or moving the 3D scanner or a portion thereof) that the light is directed towards the desired spot of light. In this embodiment, the 3D scanner 202 may be a laser tracker.

In an embodiment, the identify gestures module 254 may receive an image from the omnidirectional camera 204. In respond to receiving the image, the module 254 may perform image analysis to identify an operator within the image. Based at least in part on identifying the operator, the module 254 may determine the operator is performing a gesture, such as by positioning their hands or their arms in a predetermined position (e.g. using a skeletal model). This predetermined position is compared with a table of operator positions and an associated control method is performed (e.g. measure 3D coordinates). In an embodiment, the gestures module operates in the manner described in commonly owned U.S. Pat. No. 8,537,371 entitled "Method and Apparatus for Using Gestures to Control a Laser Tracker", the contents of which are incorporated by reference herein.

In an embodiment, the 3D scanner 202 and the omnidirectional camera 204 are moved through the environment, such as on the mobile platform 234. In an embodiment, a plurality of images are acquired by the omnidirectional camera 204 while the mobile platform 234 is moved through the environment. These plurality of images may be used to generate a two-dimensional (2D) map of the environment using a method such as simultaneous localization and mapping (SLAM) for example. The module 256 may cooperate with trajectory determination module 258 to determine the trajectory (e.g. the 3D path) that the 3D scanner 202 follows through the environment. In an embodiment, the determined trajectory is used by the register point cloud module 248 to register the 3D coordinates in a common frame of reference.

It should be appreciated that the omnidirectional camera 204 provides advantages to the modules 242 in allowing the control methods to be executed faster (e.g. less images are used) or perform methods that are not possible with traditional cameras with a narrower field of view.

Figure 3A:
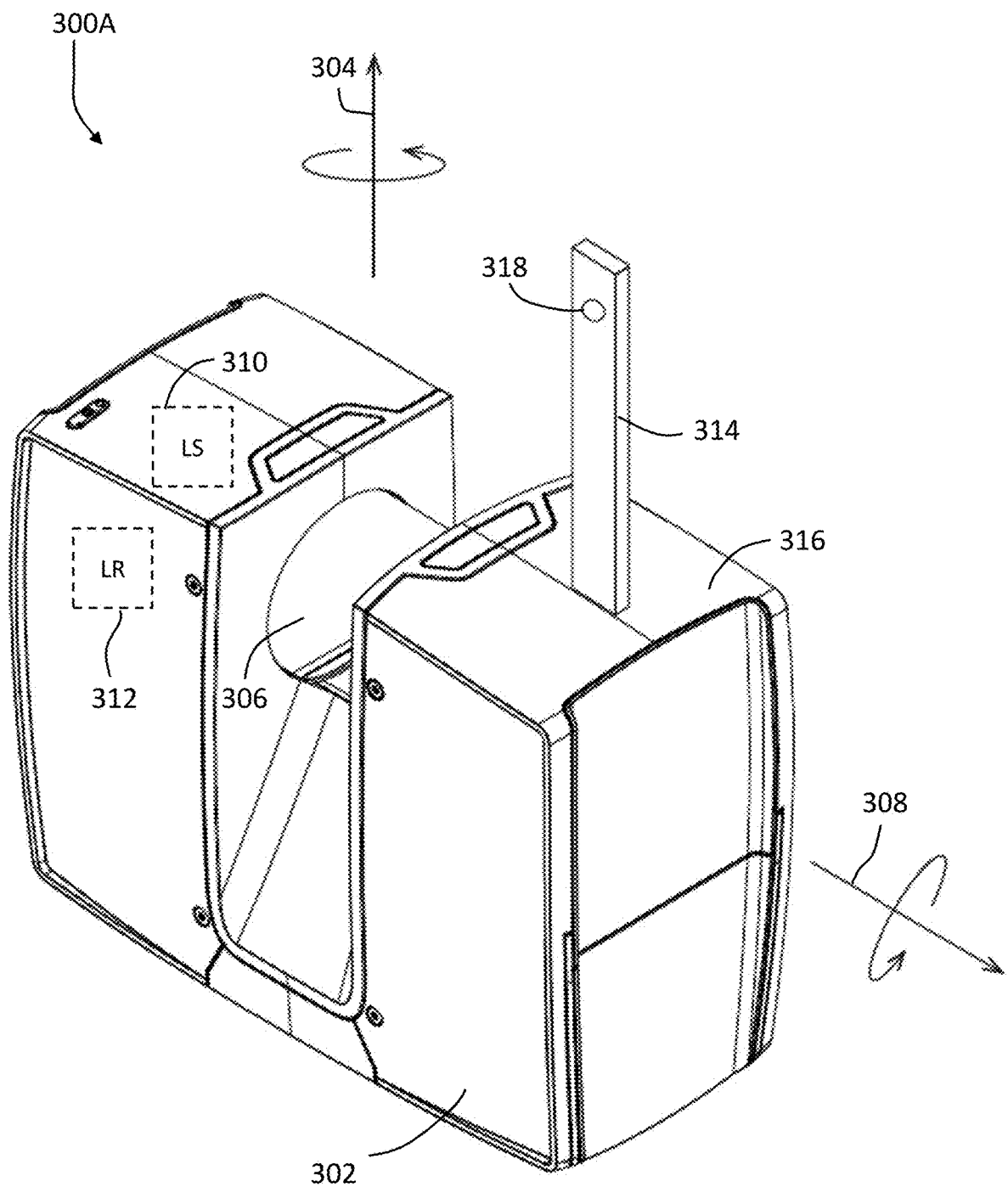
FIG. 3A is a perspective view of a laser scanner measurement device having the camera of FIG. 1B or FIG. 1C in accordance with an embodiment.

Referring now to FIG. 3A, an embodiment is shown of a 3D scanner that is a laser scanner 300A. In an embodiment, the laser scanner 300A may operate to measure 3D coordinates as described in commonly owned U.S. Pat. No. 9,074,878 entitled "Laser Scanner", the contents of which are incorporated by reference herein. The laser scanner 300A rotates includes a housing 302 that rotates about a vertical or azimuthal axis 304. The laser scanner 300A further includes a rotating mirror 306 that is oriented on a 45 degree angle relative to a horizontal or zenith axis 308. A light source 310 is arranged to direct a beam of light along the horizontal axis 308 onto the rotating mirror 306 and into the environment. The beam of light reflects off of a surface in the environment and a portion returns along the direction of emission back onto the mirror 306. The mirror 306 reflects the return light on to a light receiver or optical sensor 312. Based on the time of flight of the light beam, the distance to the surface may be determined. The laser scanner 300A further includes rotary encoders (not shown) that measure the position of the housing 302 about the vertical axis 304 and the horizontal axis 308. Based on these encoder signals and the distance to the surface, a 3D coordinate of the point where the beam of light reflects may be determined. It should be appreciated that by rotating the housing about the vertical axis 304 by 180 degrees, a volume of the environment may be measured.

In an embodiment, an image acquisition system or omnidirectional camera 314 is mounted on a top surface 316 of the housing 302. In this embodiment, the omnidirectional camera 314 may have a thin rectangular body with a pair of opposing fisheye lens 318, each of which is configured to have a field of view equal to or greater than 180 degrees (e.g. like camera 104, FIG. 1C). In an embodiment, the omnidirectional camera is oriented with the longitudinal axis of the camera 314 being parallel to the vertical axis 304. In other words, the optical axis of the lens 318 is parallel with the with plane that the horizontal axis 308 is located.

It should be appreciated that in this embodiment, the omnidirectional camera 314 can acquire images that define a 360 degree image of the environment about laser scanner 300A. As a result, the simultaneous acquisition of the images with a field of view equal to or greater than 180 degrees allows for a single acquisition of the environment that may be used to assign a color the 3D coordinates/point cloud. It should be appreciated that this provides advantages in a faster scanning times since multiple images are not required and also smaller memory and storage of the data.

Figure 3B:
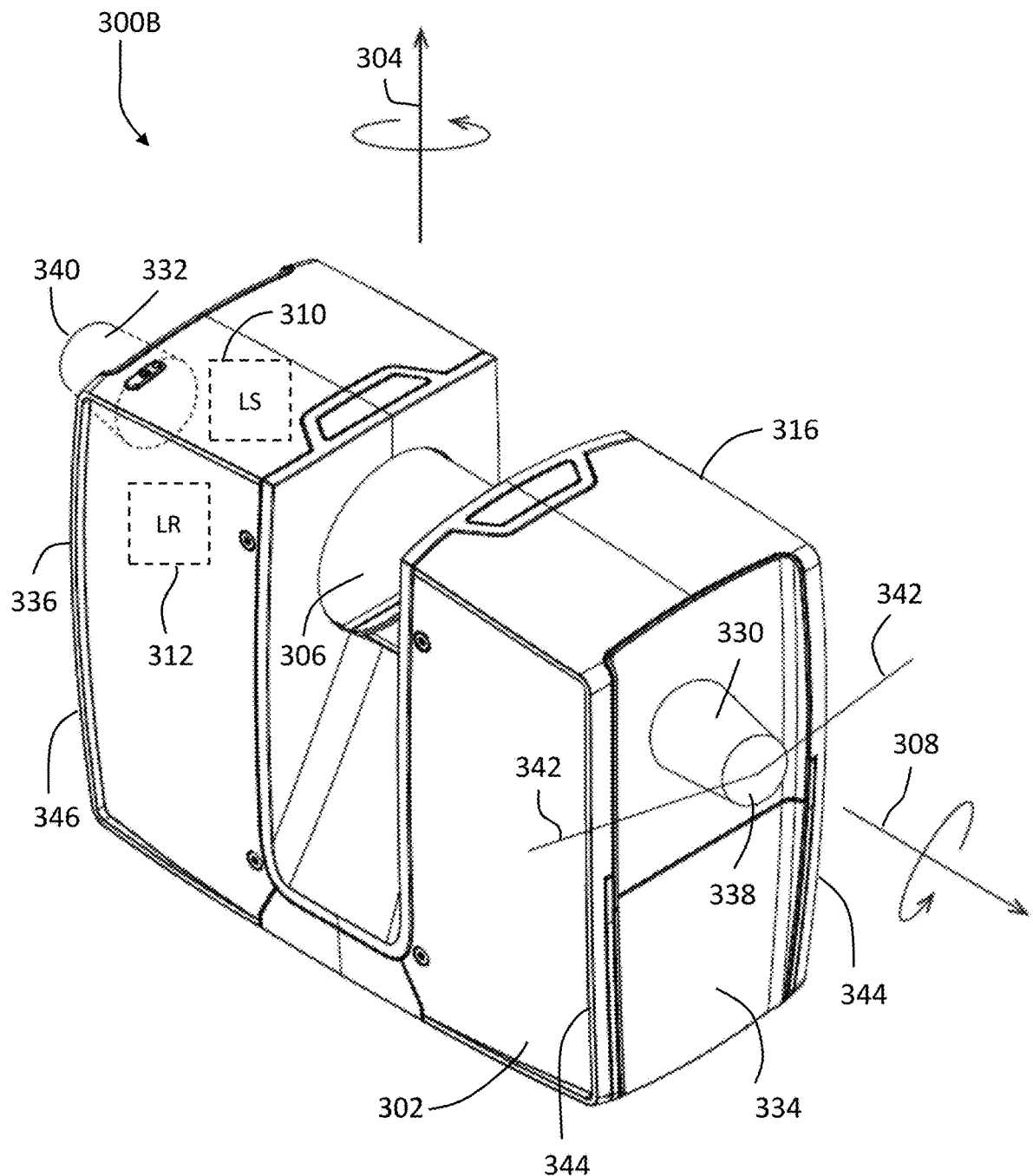
FIG. 3B is a perspective view of another laser scanner measurement device having the camera of FIG. 1B or FIG. 1C in accordance with an embodiment.

Referring now to FIG. 3B, another embodiment is shown of a laser scanner 300B. The laser scanner 300B is substantially similar and operates in the same manner as laser scanner 300A. In this embodiment, the omnidirectional camera is bifurcated into a first camera 330 and a second camera 332 that are positioned on opposite sides 334, 336 of the housing 302. In this embodiment, each camera 330, 332 has a fisheye lens 338, 340 with a field of view greater than 180 degrees (e.g. like camera 104, FIG. 1C). The lens 338, 340 are spaced apart from the sides 334, 336 such that the field of view (the inner boundary of which is partially indicated by the lines 342) is not interfered with by the edges 344, 346 of the sides 334, 336. In the illustrated embodiment, the optical axis for each lens 338, 340 is parallel with the horizontal axis 308. In an embodiment, the optical axis of each lens 338, 340 is coaxial with the horizontal axis 308.

In the same manner as the embodiment of FIG. 3A, the scanner 300B can acquire images from each of the cameras 338, 340. Since the lenses 338, 340 have fields of view greater than 180 degrees, the acquired images can be combined to form a 360 image of the environment about the laser scanner 300B.

It should be appreciated that the scanner 300B may include omnidirectional cameras in addition to omnidirectional cameras 330, 332. For example, the scanner 300B may include omnidirectional cameras on the sides of the housing 302.

Figure 4A:
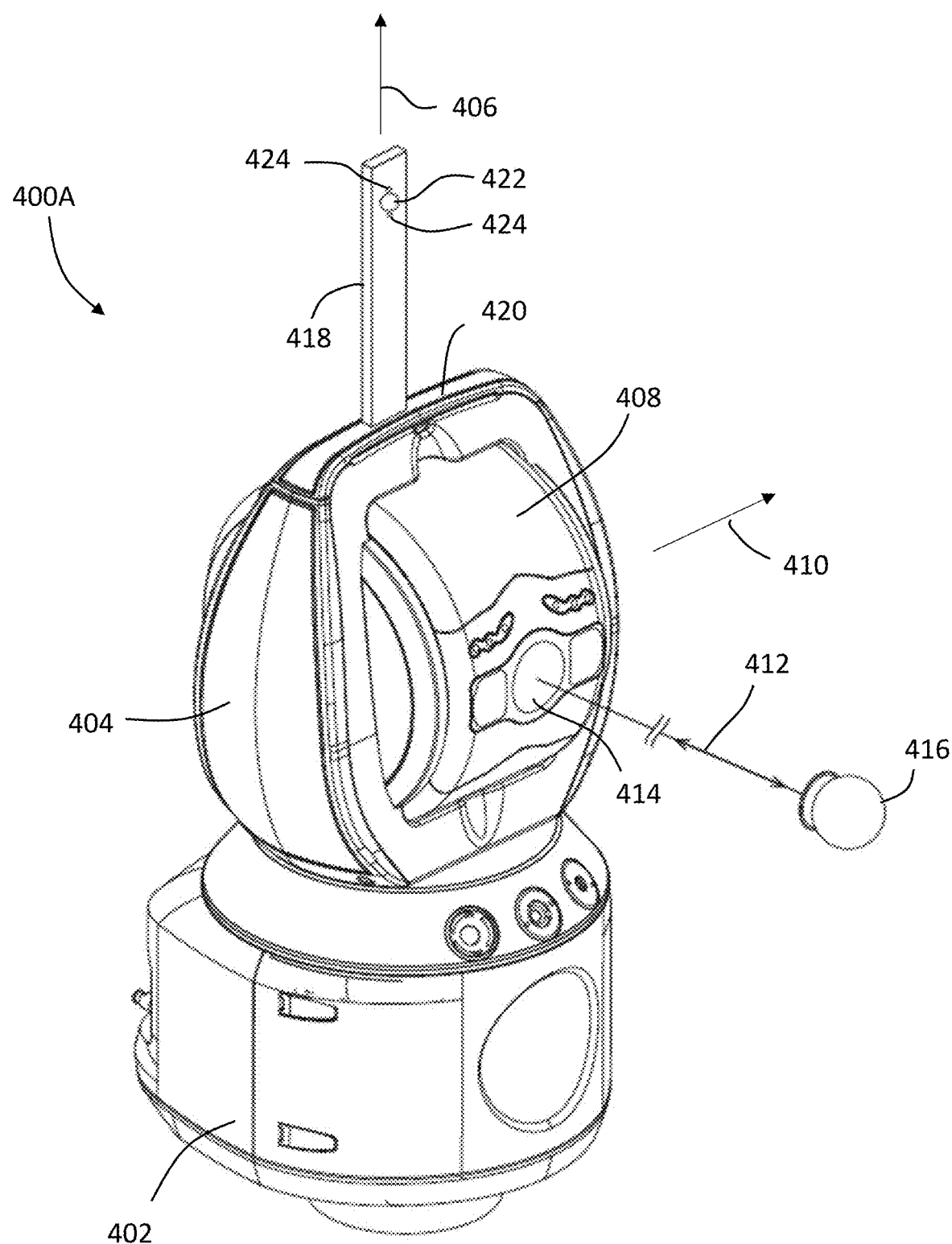
FIG. 4A is a perspective view of a laser tracker measurement device having the camera of FIG. 1B or FIG. 1C in accordance with an embodiment.

Referring now to FIG. 4A, an embodiment is shown where the 3D scanner is a laser tracker 400A. In an embodiment, the laser tracker may be the same as that described in commonly owned United States Patent Publication 2018/0095174 entitled "Three-dimensional Coordinate Measuring Device", the contents of which are incorporated by reference herein. It should be appreciated that while the scanner of FIG. 4A is referred to as a "laser" tracker, devices of this type may not emit or launch a laser beam of light, but may also emit light from a superluminescent diode, an LED, or any other light source. The laser tracker 400A includes a base 402 with a yoke 404 rotationally mounted thereon to rotate about the vertical axis 406. Mounted to the yoke 404 is a payload 408 that rotates about the horizontal or zenith axis 410. The laser tracker 400A includes one or more processors that are responsive to operate motors (not shown), configured to rotate the yoke 404 and the payload 408.

Arranged within the payload is a light source and associated optics (e.g. fiber optics, lens, etc.) that are arranged to launch a beam of light 412 out of an aperture 414. When the beam of light is directed towards a retroreflective target 416, the beam of light 412 will travel along the same optical path back through the aperture 414. A light receiver, such as an absolute distance meter (ADM), measures the distance to the retroreflective target. The laser tracker 400A includes one or more processors that are operable to rotate the yoke 404 and payload 408 to follow or continue to direct the beam of light 412 towards the retroreflective target 416.

In order for the laser tracker 400A to follow the retroreflective target 416, the light beam 412 needs to be directed onto the target 416 and the reflected light received by the light receiver. Prior art laser trackers, had cameras with a narrow field of view, which in some instances caused multiple images with the payload at different orientations to be acquired until one or more targets could be found.

In an embodiment, the laser tracker 400A further includes an image acquisition system or omnidirectional camera 418 mounted to a top surface 420 of the yoke 404. In this embodiment, the omnidirectional camera 418 includes a pair of opposing fisheye lenses 422 that have a field of view equal to or greater than 180 degrees (e.g. like camera 104, FIG. 1C). The optical axis of the lenses 422 are oriented to be parallel to the plane that the horizontal axis 410 moves.

In operation, the laser tracker 400A flashes a light, such as lights 424 for example. This flash or impulse of light illuminates the environment. It should be appreciated that the retroreflective target 416 will reflect the light back towards the laser tracker to a much greater degree than the diffuse surfaces of the environment. As a result, in an image acquired by the omnidirectional camera the retroreflective target 416 will be a bright spot or area of light. It should be appreciated that with the bright spots of light identified in the image, the controller can rotate the yoke 404 and payload 408 towards the area the bright spot is located in the image until the beam of light 412 is directed towards the bright spot of light and onto the retroreflective target 416.

Figure 4B:
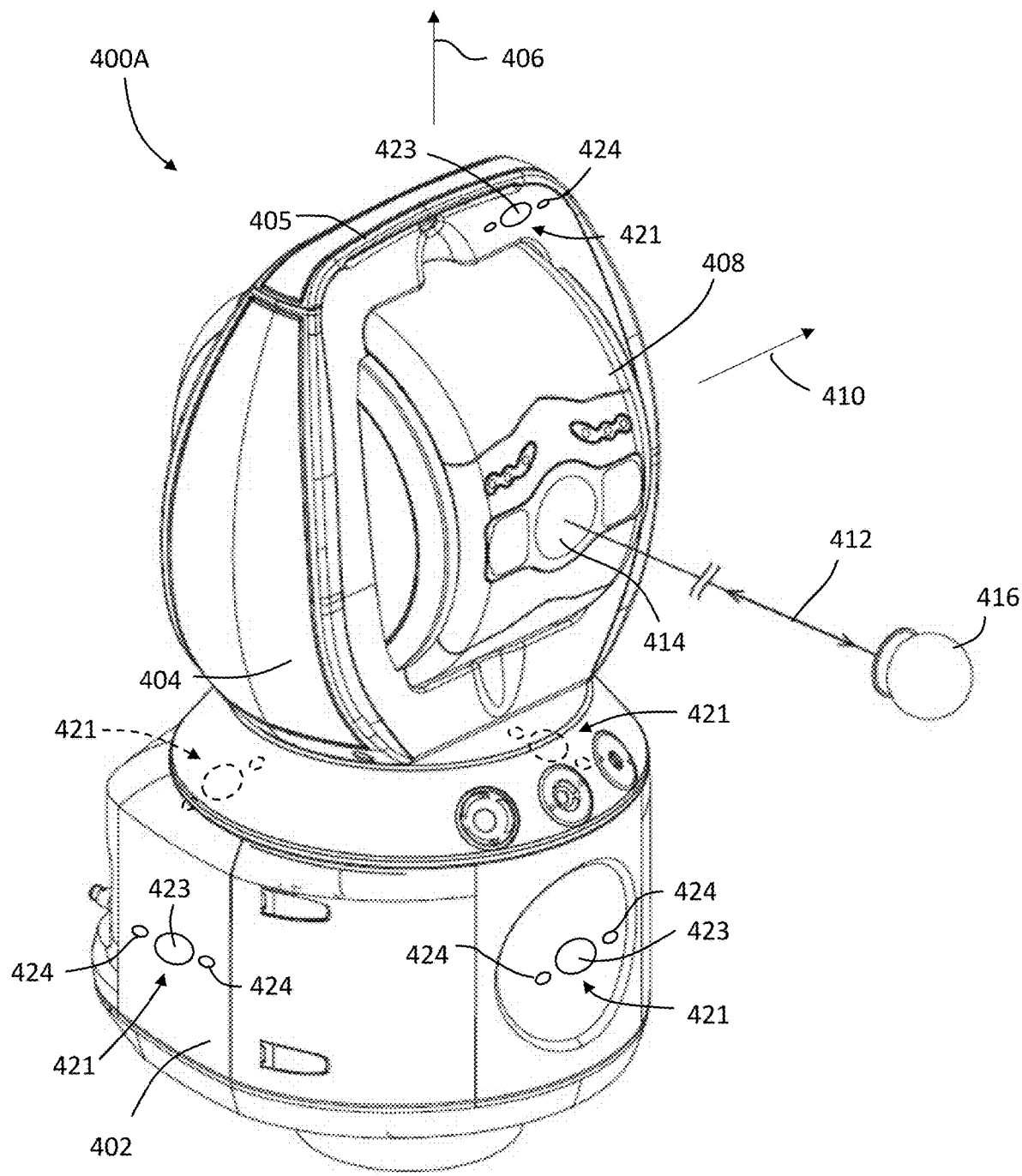
FIG. 4B is a perspective view of a laser tracker measurement device having the camera of FIG. 1B or FIG. 1C in accordance with an embodiment.

Referring now to FIG. 4B, an embodiment of another laser tracker 400B. The laser tracker 400B operates in substantially the same manner as described above with respect to laser tracker 400A. In this embodiment, the omnidirectional camera 421 is integrated into the cross member 405 of yoke 404 with a first fisheye lens 423 being positioned on one side of the cross member 405 and a second fisheye lens (not shown) being positioned on a second opposite side of the cross member 405. In an embodiment, the positioning of the second fisheye lens is directly opposite the first fisheye lens 423. In an embodiment, the optical axis of the omnidirectional camera 421 is substantially perpendicular to the axis 406, 410. It should be appreciated that the sides of the cross member 405 and the field of view of the omnidirectional camera 421 may be selected such that the edges yoke 404 do not interfere with the acquisition of images by the omnidirectional camera.

In the same manner as the embodiment of FIG. 4A, the laser tracker 400B can acquire images from each of the cameras 421. Since the lenses 423 have fields of view greater than 180 degrees, the acquired images can be combined to form a 360 image of the environment about the laser tracker 400B.

It should be appreciated that the laser tracker 400B may include additional cameras 421 (e.g. three or four cameras 421). For example, in an embodiment, two additional cameras 421 are position around the periphery of a fixed part, such as the base 402, of the laser tracker (402) to provide a 360 degree image about the laser track 400A.

It should further be appreciated that in some embodiments, the cameras 421 may be positioned only on the base 402 and the cameras 421 on the yoke 404 may be omitted.

A common operation of a laser tracker is to illuminate one ore more retroreflective targets 416 with a light source place near a camera. An example of such light sources and cameras available on trackers today is shown in elements 430A, 430B of FIGS. 4A, 4B. Such light sources and cameras have the ability to view over a limited field of view on currently available trackers. In embodiments illustrated in FIGS. 4A, 4B, light sources and cameras are able to cover a field of view of 360 degrees around the tracker, for example, using light sources 424 and cameras 422, 423. With the laser tracker, such 360-degree field-of-view light sources and cameras enable the tracker to view retroreflectors from all directions around the camera. This capability may be advantageously used in many ways, for example, (1) to note the position of all retroreflectors surrounding the tracker, (2) to display such retroreflector positions on display such as a display on a smart phone, (3) to note when a retroreflector is in motion, and (4) to respond to a command or gesture given by an operator to lock onto a particular retroreflector. In still another embodiment, the laser tracker identifies a movement of the retroreflector based at least in part on images acquired by the omnidirectional camera 418. In an embodiment, the laser tracker then rotates the payload 408 about the axis 406, 410 to cause the light beam 412 to lock on or follow the movement of the retroreflector.

Figure 5A:
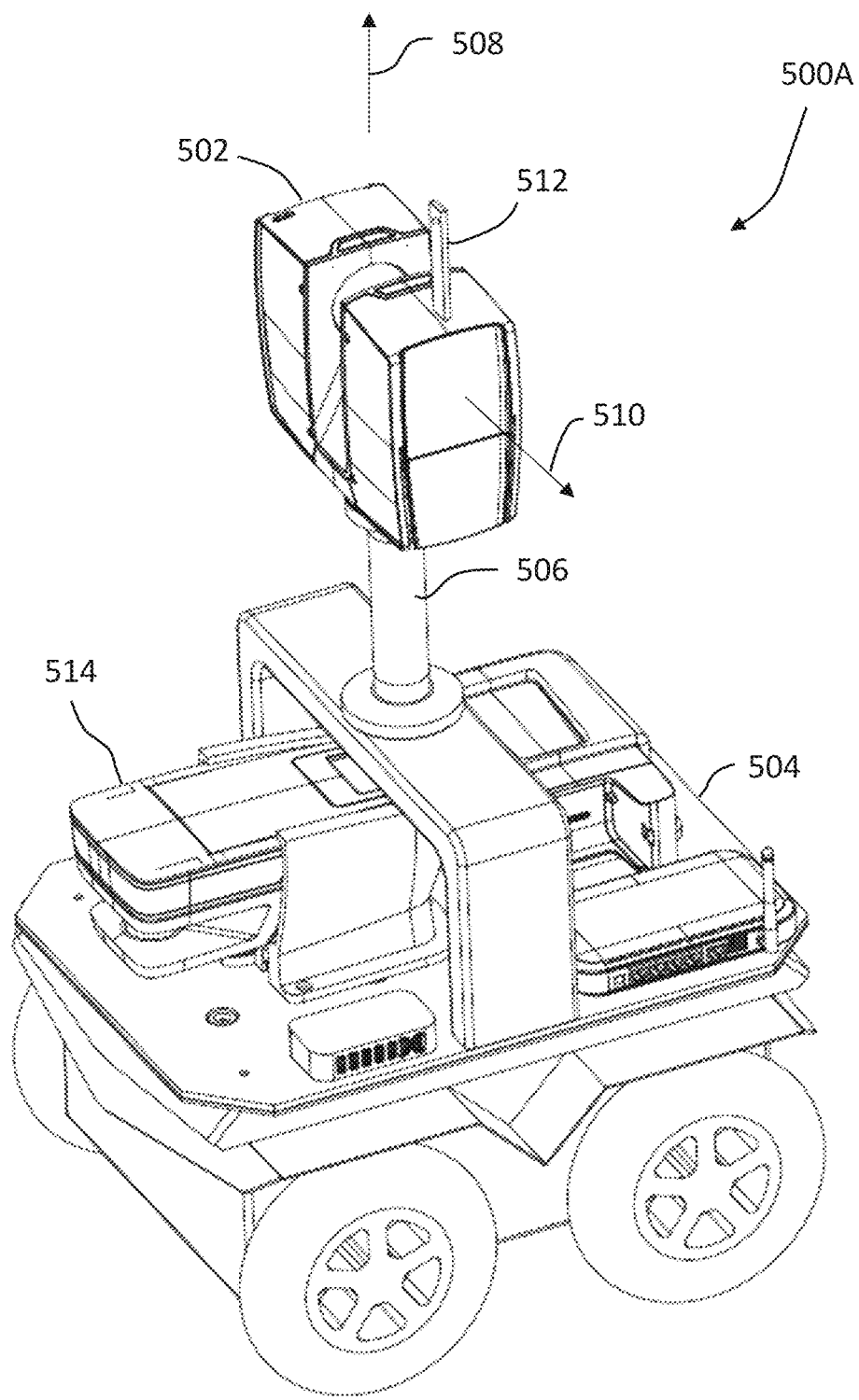
FIG. 5A is a perspective view of a laser scanner measurement device having the camera of FIG. 1B or FIG. 1C mounted on a mobile platform in accordance with an embodiment.

Referring now to FIG. 5A, an embodiment is shown of a scanning system 500A having the scanner 502 mounted on a movable platform 504. In an embodiment, the scanner 502 is the same as the laser scanner 300A of FIG. 3A. The scanner 502 is mounted to a post 506 that allows the scanner 502 to rotate about the vertical-axis 508 while the mirror 306 (FIG. 3A) rotates about the horizontal axis 510. During operation, the scanner 502 rotates about the vertical axis 508 while the mirror 306 rotates about the horizontal axis 510 to acquire 3D coordinates of surfaces in a volume about the scanner 502.

In an embodiment, the mobile platform 504 is the same as that described in United States Patent Publication 2020/0109937 entitled "System and Method of Define a Path and Scanning an Environment", or United States Patent Publication 2019/0154806 entitled "System for Surface Analysis and Method Thereof", the contents of both of which are incorporated by reference herein.

In an embodiment, the omnidirectional camera 512 includes two opposing fisheye lenses each with a field of view that is equal to or greater than 180 degrees. As a result, when images are acquired, a 360 degree view about the scanner 502. In an embodiment, the system 500A is configured to acquire images with the omnidirectional camera on a periodic, aperiodic, or continuous basis. In an embodiment, the system 500A is configured to acquire images with the omnidirectional camera 512 based on another parameter, such as but not limited to: when the mobile platform 504 has moved a predetermined distance; or when the scanner 502 has acquired a predetermined number of 3D coordinate data points, for example.

It should be appreciated that since the omnidirectional camera 512 allows the generation of a 360 degree image, the omnidirectional camera 512 may acquire images with the scanner 502 positioned at any rotational orientation about the vertical axis 508.

In an embodiment, the mobile platform 504 includes a 2D scanner 514. The 2D scanner 514 acquires coordinates in a plane generally parallel with the surface on which the mobile platform 504 is moving. The 2D scanner 514 may be used to generate a 2D map, such as a grid map for example. The 2D map may be used to determine the trajectory of the mobile platform 504 through the environment. In an embodiment, the 2D map may be generated using simultaneous localization and mapping methods.

In another embodiment, the 2D scanner 514 is omitted and the localization of the mobile platform 504 and the determination of the trajectory of the scanner 502 are performed based at least in part on the images acquired by the omnidirectional camera 512, such as by using photogrammetry for example. In an embodiment, the generation of the 2D map and the trajectory is generated using the omnidirectional camera 512 using simultaneous localization and mapping methods. In an embodiment, information from the images acquired by the omnidirectional camera 512 are fused with data from other sensors, such as sensors 230 (FIG. 2) for example.

Figure 5B:
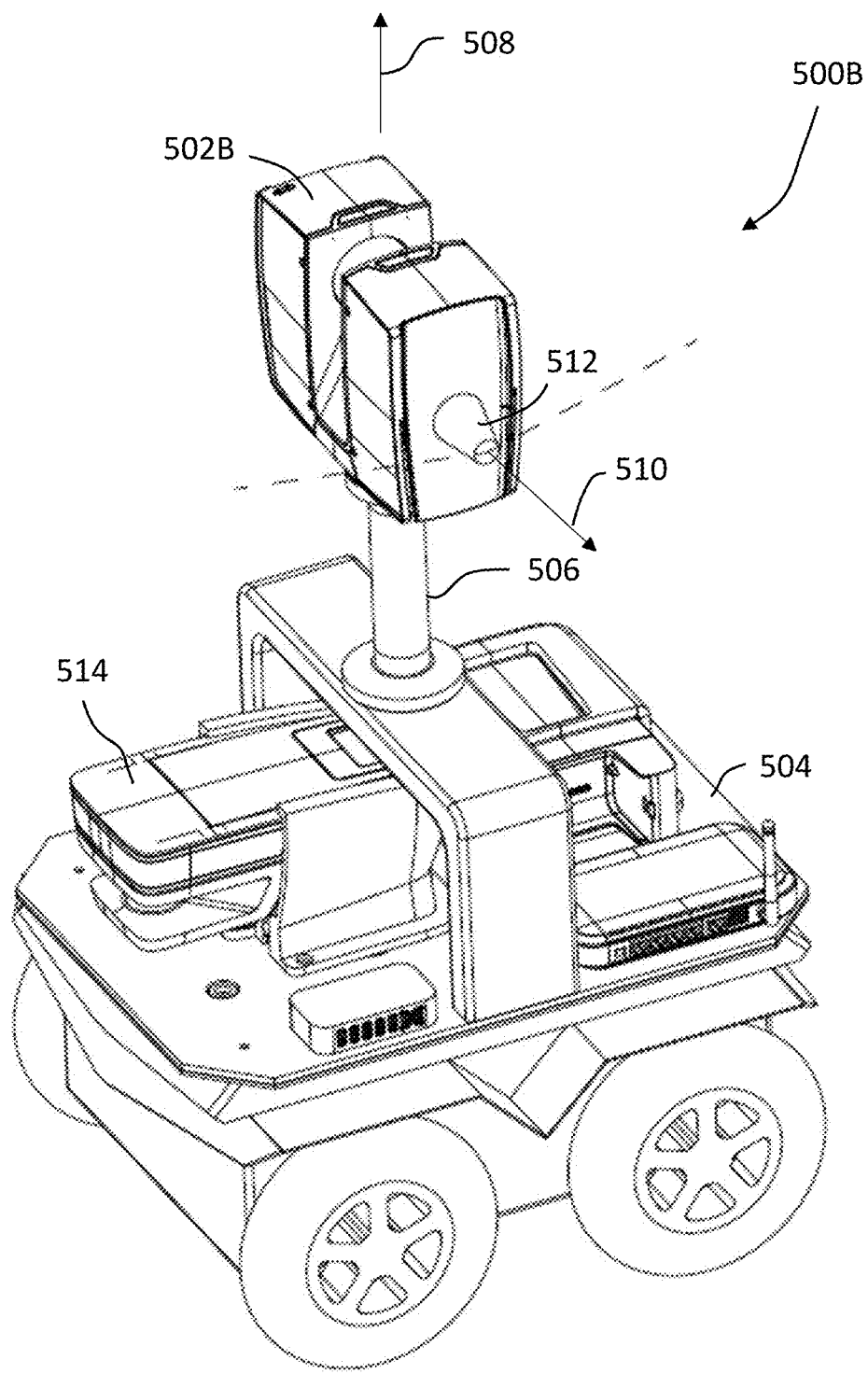
FIG. 5B is a perspective view of another laser scanner measurement device having the camera of FIG. 1B or FIG. 1C mounted on a mobile platform in accordance with an embodiment.

Referring now to FIG. 5B, an embodiment is shown of a system 500B having a scanner 502B mounted to a mobile platform 504. The system 500B is substantially the same as system 500A except that the scanner 502B has the omnidirectional camera 512 with lenses mounted on opposite sides of the scanner housing. In an embodiment, the scanner 502B is the same as laser scanner 300B of FIG. 3B.

Figure 6A:
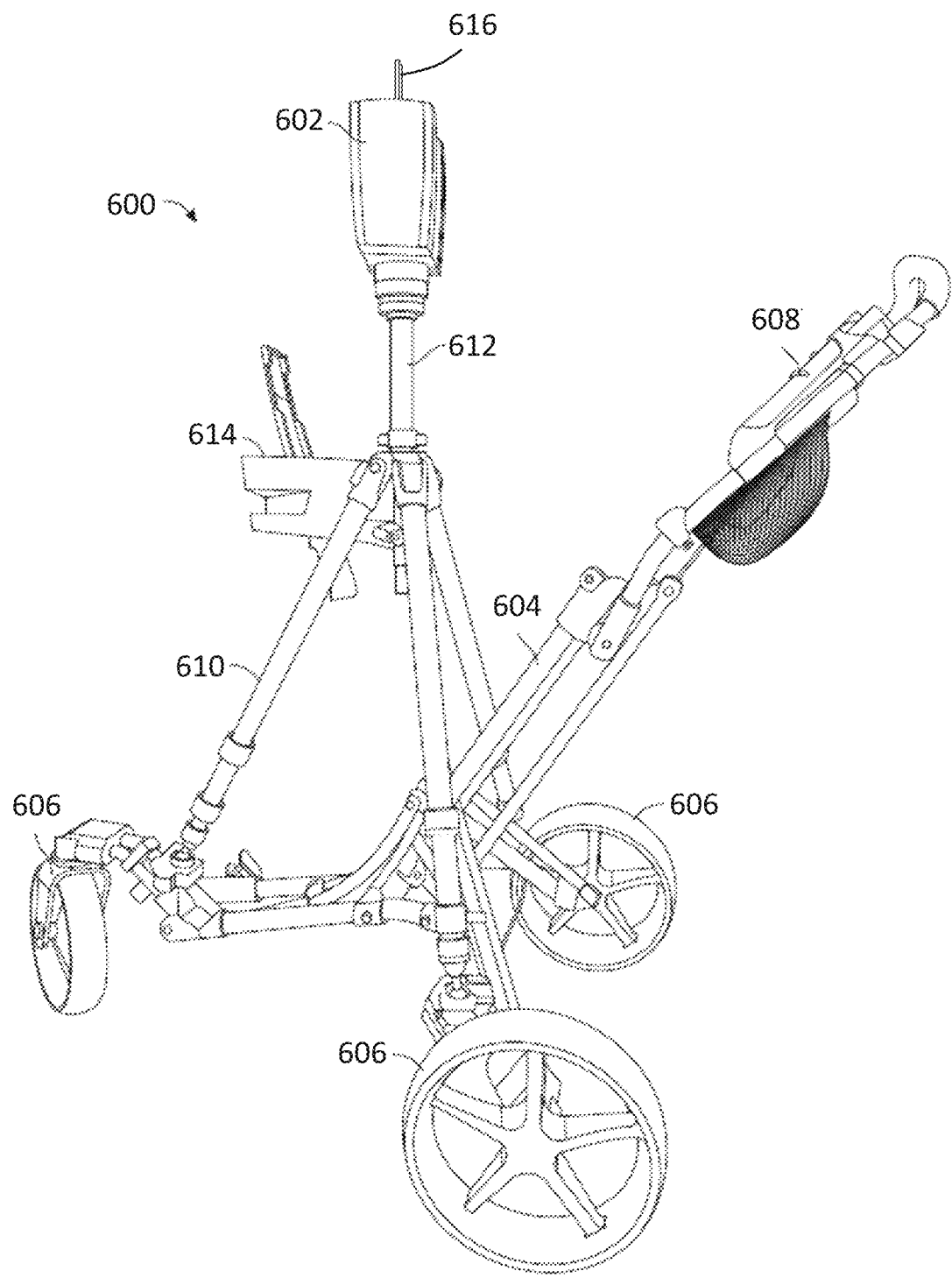
FIG. 6A is a perspective view of a laser scanner measurement device having the camera of FIG. 1B or FIG. 1C mounted on another mobile platform in accordance with an embodiment.
Figure 6B:
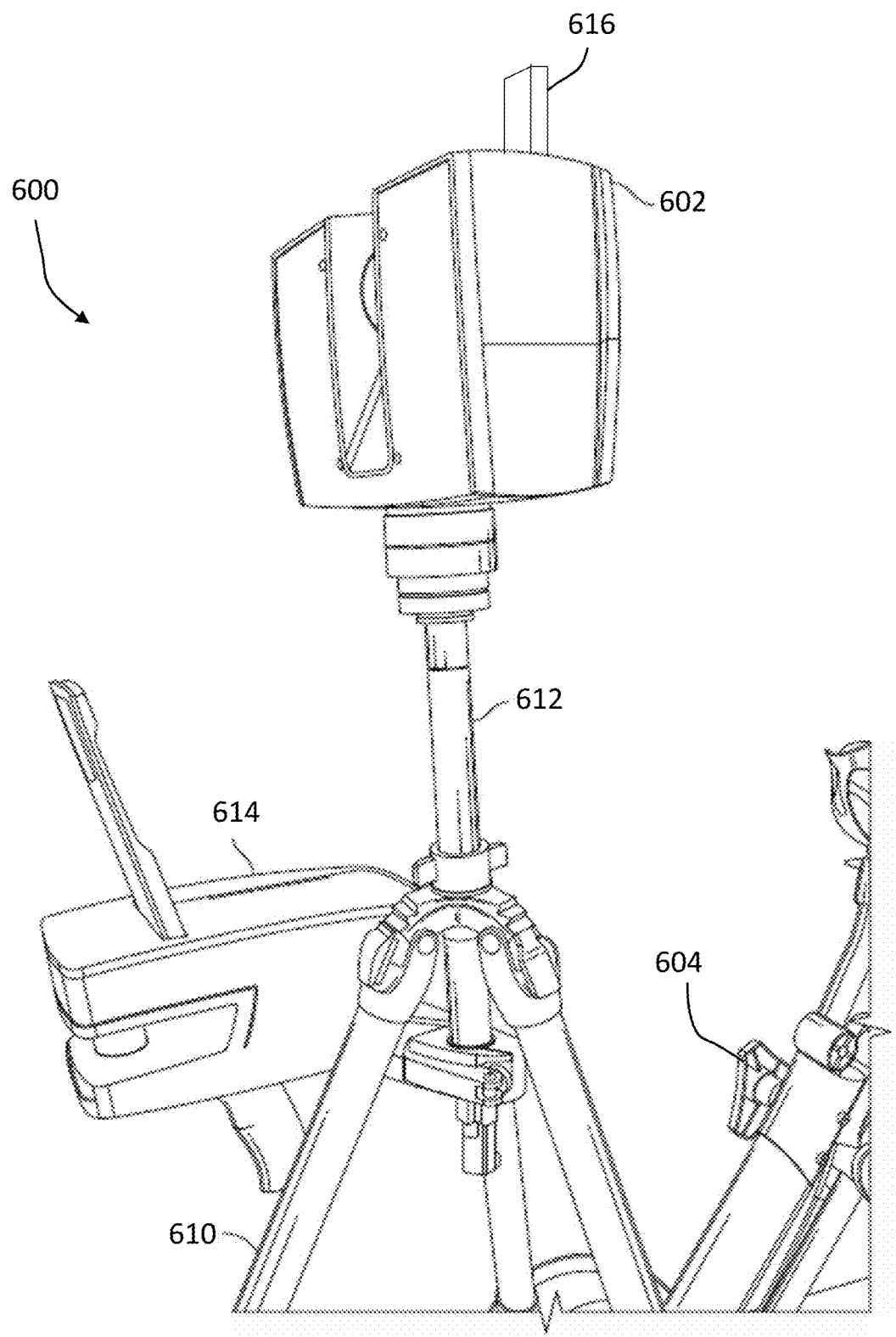
FIG. 6B is a perspective view of the laser scanner measurement device of FIG. 6A.

Referring now to FIG. 6A-6B, an embodiment is shown of system 600 that includes a scanner 602 mounted to a mobile platform 604. In this embodiment, the mobile platform 604 includes a plurality of wheels 606 and a handle 608. The handle 608 is positioned to allow an operator to grip and push the system 600. The mobile platform 604 includes a tripod 610 with a post 612 extending therefrom. In the illustrated embodiment, the scanner 602 is mounted to rotate about the center axis of the post 612. In the illustrated embodiment, the system 600 includes a 2D scanner 614.

In the illustrated embodiment, the system 600 includes an omnidirectional camera 616 mounted to the top of the scanner 602, in the same manner as laser scanner 300A of FIG. 3A. It should be appreciated, however, that the laser scanner 300B of FIG. 3B may be substituted for the scanner 300A without deviating from the teachings herein.

The system 600 operates in a similar manner to system 500A, except that the mobile platform 604 is manually moved through the environment by the operator, instead of moving in an autonomous, semi-autonomous, or remote control manner. In an embodiment, the system 600 may move in the same manner as that described in United States Patent Publication 2020/0109943 entitled "System and Method of Defining a Path and Scanning an Environment", the contents of which are incorporated by reference herein.

Figure 6C:
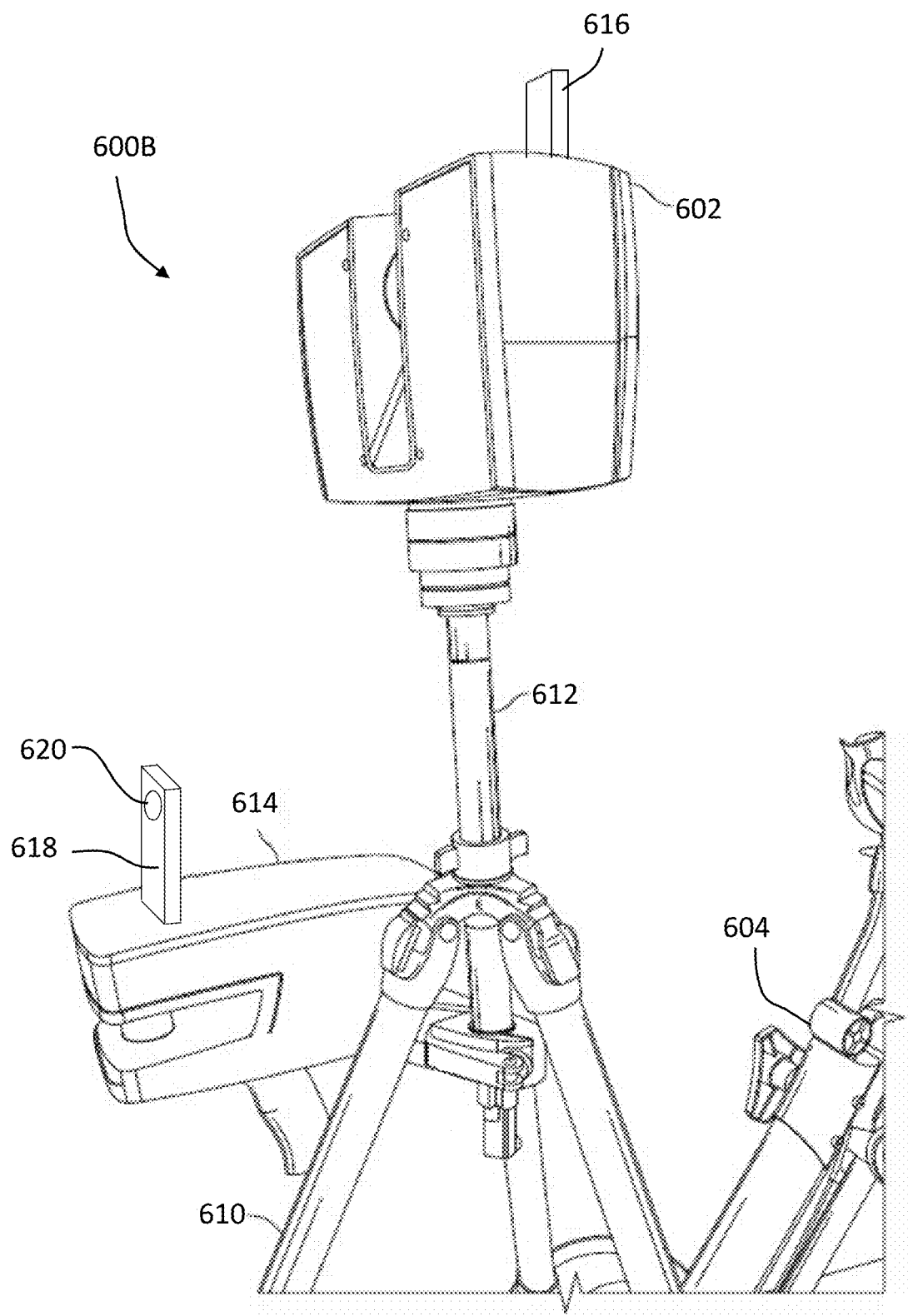
FIG. 6C is a perspective view of a laser scanner measurement device having a pair of cameras of FIG. 1B or FIG. 1C that is mounted on a mobile platform in accordance with an embodiment.

Referring now to FIG. 6C, an embodiment is shown of another system 600B. The system 600B may be the same as system 600A having a scanner 602 mounted on a post 612 of a mobile platform 604. In this embodiment, a second camera 618 mounted on a top surface of the 2D scanner 614. In an embodiment, the second camera 618 is an omnidirectional camera having a pair of opposing fisheye lenses 620 as described herein (e.g. like camera 104, FIG. 1C). In another embodiment, the second camera 618 has a single fisheye lens 620 with a field of view greater than 180 degrees and less than 360 degrees.

In an embodiment, the second camera 617 may be used in combination with the omnidirectional camera 616, such as to avoid having occlusions in the generated 360 degree image. In another embodiment, the second camera 617 cooperates with the 2D scanner 614 to use the image acquired by the second camera 618 to generate the 2D map while the omnidirectional camera 616 is used for another function, such as but not limited to colorizing the 3D coordinates acquired by the scanner 602.

Figure 6D:
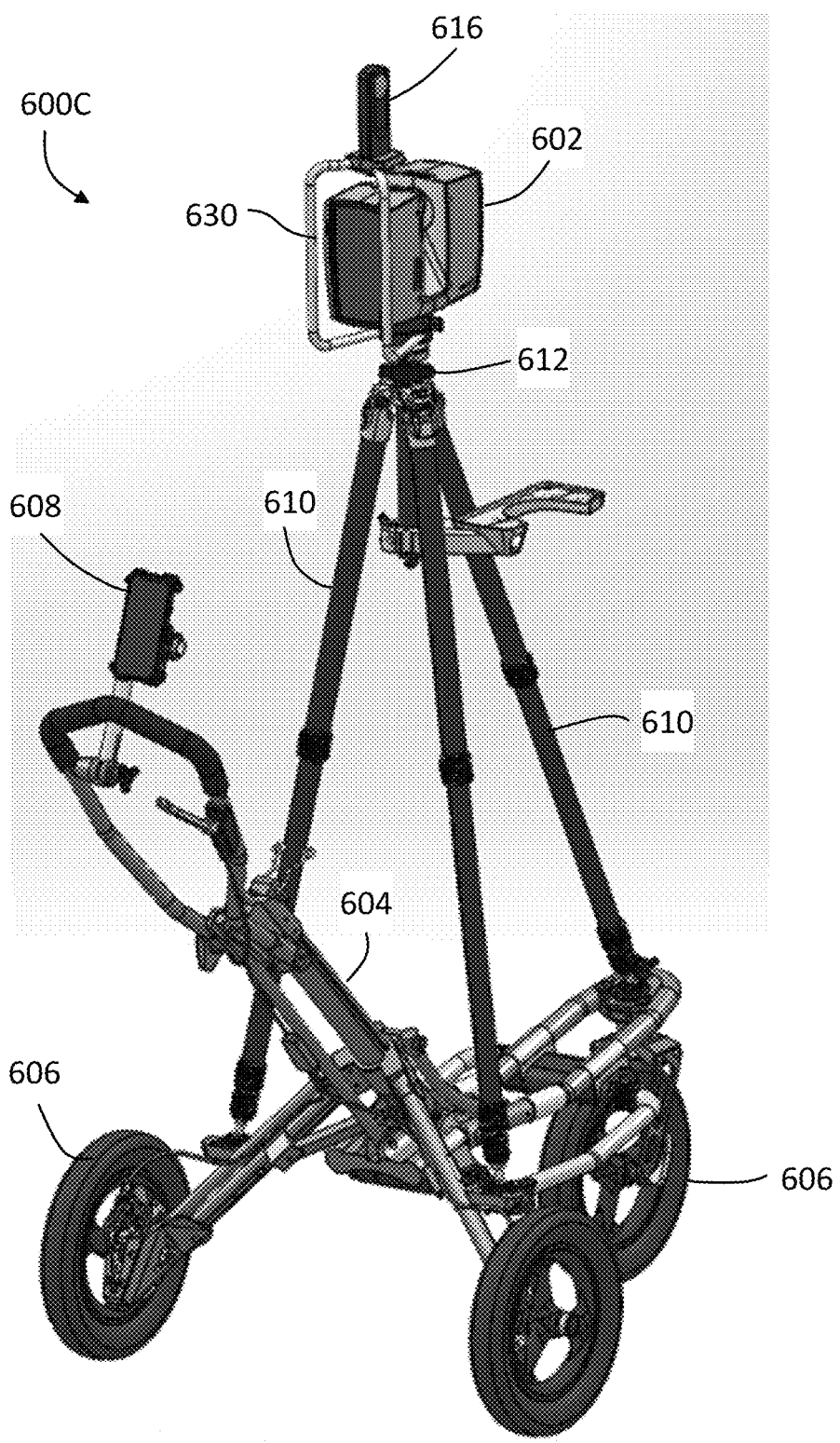
FIG. 6D is a perspective view of a having the camera of FIG. 1B or FIG. 1C mounted on another mobile platform by a bracket that positions the camera above the scanning device in accordance with an embodiment.

Referring now to FIG. 6D, an embodiment is shown of another system 600C. The system 600C may be the same as system 600A having a scanner 602 mounted on a structure or post 612 of a mobile platform 604. In this embodiment, a bracket 630 is coupled to the structure of post 612. The bracket 620 includes a first end coupled to the post 612 and a second end positioned adjacent a top portion of the scanner 602 housing. The omnidirectional camera 616 is mounted to the second end. In an embodiment, the bracket 630 forms a generally U-shape that allows the scanner 602 to pass between the first end and the second end. It should be appreciated that the omnidirectional camera 616 remains in a fixed pose relative to the scanner 602 during operation. In an embodiment, the omnidirectional camera 616 is oriented on the bracket 630 such that the optical axis of the lens are generally perpendicular to the direction of movement or perpendicular to the length of the mobile platform 604.

In an embodiment, the system 600C includes one or more processors that are operably coupled to the scanner 602, optional scanner 614 (not shown in FIG. 6D), and the omnidirectional camera 616. In this embodiment, the omnidirectional camera 616 acquires a plurality of images of the environment as the system 600C is moved from a first position to a second position. Based at least in part on these plurality of images, the one or more processors may register the three-dimensional coordinates acquired as the system 600C is moved into a common coordinate frame of reference. In an embodiment, the plurality of images allows the identification of targets, either natural features or artificial targets, to determine the position and pose of the scanner 602 as the system 600C is being moved.

It should be appreciated that while the illustrated embodiment of FIG. 6D shows the omnidirectional camera 616 as being positioned above the scanner 602, this is for example purposes and the claims should not be so limited. In other embodiments, the omnidirectional camera may be mounted in other locations on the mobile platform 604, such as but not limited to the 2D scanner 614, the tripod 610, on or adjacent to the handle 608, or on another portion of the post 612.

The term "about" is intended to include the degree of error associated with measurement of the particular quantity based upon the equipment available at the time of filing the application.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A 3D measurement system comprising:
   a 3D measurement device;
   a 360 degree image acquisition system coupled in a fixed relationship to the 3D measurement device, the 360 degree image acquisition system includes:
      a first photosensitive array operably coupled to a first lens, the first lens having a first optical axis in a first direction, the first lens being configured to provide a first field of view greater than 180 degrees;
      a second photosensitive array operably coupled to a second lens, the second lens having a second optical axis in a second direction, the second direction is opposite the first direction, the second lens being configured to provide a second field of view greater than 180 degrees; and
      a controller configured to:
         illuminate a light source towards an environment;
         acquire at least one image of the environment while illuminated by the light source; and
         change a direction of the 3D measurement device based on content of the at least one image,
      wherein the first field of view at least partially overlaps with the second field of view.

2. The system of claim 1, wherein the first optical axis and second optical axis are coaxial.

3. The system of claim 1, wherein first photosensitive array is positioned adjacent the second photosensitive array.

4. The system of claim 1, wherein the 360 degree image acquisition system extends from a top portion of the 3D measurement system.

5. The system of claim 1, wherein the first lens is arranged at least partially on a first projecting extending from a first side of the 3D measurement system, the second lens being at least partially arranged on a second projection extending from a second side of the 3D measurement system.

6. A laser scanner comprising:
   a housing;
   a light emitter and a light receiver disposed within the housing;
   a beam steering device operably coupled to the housing and disposed to reflect light received from the light emitter and direct reflected light received from the environment onto the light receiver;
   a first angular transducer that measures a first angle of rotation of the housing about a first axis;
   a second angular transducer that measures a second angle of rotation of the beam steering device about a second axis;
   a controller configured to:
      illuminate a light source towards the environment;
      acquire at least one image of the environment while illuminated by the light source; and
      change a direction of the housing based on content of the at least one image; and
   an image acquisition system operably coupled to the housing, the image acquisition system including:
      a first photosensitive array operably coupled to a first lens, the first lens having a first optical axis in a first direction, the first lens being configured to provide a first field of view greater than 180 degrees about the housing; and
      a second photosensitive array operably coupled to a second lens, the second lens having a second optical axis in a second direction, the second direction is opposite the first direction, the second lens being configured to provide a second field of view greater than 180 degrees about the housing; and
   wherein the first field of view at least partially overlaps with the second field of view.

7. The scanner of claim 6, wherein the image acquisition system extends from a top portion of the housing.

8. The scanner of claim 6, wherein the first lens is arranged at least partially on a first projecting extending from a first side of the housing, the second lens being at least partially arranged on a second projection extending from a second side of the housing.

9. The scanner of claim 6, wherein the 3D device has a distance meter.

10. The scanner of claim 6, wherein the image acquisition system is mounted on a top portion of the housing.

11. The scanner of claim 6, further comprising a mobile platform, the housing being mounted on the mobile platform.

12. The scanner of claim 11, further comprising a second coordinate measurement device configured to measure three-dimensional coordinates in a volume about the second coordinate measurement device.

13. The scanner of claim 12, wherein the mobile platform includes a structure extending in a direction away from a surface that the mobile platform is located, the first coordinate measurement device being mounted to an end of the structure.

14. The scanner of claim 13, wherein the image acquisition system is operably mounted to the structure.

15. The scanner of claim 14, wherein the image acquisition system is mounted to the structure by a bracket, the bracket being shaped to position the image acquisition system adjacent a top portion of the housing.

16. The scanner of claim 13, further comprising a second image acquisition system being disposed on the second coordinate measurement device, the second image acquisition system including:
   a first photosensitive array operably coupled to a first lens, the first lens having a first optical axis in a first direction, the first lens being configured to provide a first field of view greater than 180 degrees about the housing; and
   a second photosensitive array operably coupled to a second lens, the second lens having a second optical axis in a second direction, the second direction is opposite the first direction, the second lens being configured to provide a second field of view greater than 180 degrees about the housing,
   wherein the first field of view at least partially overlaps with the second field of view.

17. The scanner of claim 13, further comprising at least one processor operably coupled to the first coordinate measurement device and the image acquisition system, the at least one processor being configured to register three-dimensional coordinate data acquired by the first coordinate measurement device at different time into a common coordinate frame of reference based at least in part on images acquired by the image acquisition system.

18. A laser tracking measuring device comprising
   a housing;
   a structure rotationally coupled the housing to rotate about a first axis and a second axis;
   a first light source, an absolute distance meter, a tracking system, and a first camera operably coupled to the structure, the first light source producing a first light beam that cooperates with the absolute distance meter, the tracking system configured to move the first light beam to a center of a retroreflector target, the first camera including a first lens system and a first photosensitive array;

a first angular transducer that measures a first angle of rotation of the structure about the first axis;

a second angular transducer that measures a second angle of rotation of the structure about the second axis;

a controller configured to:
  illuminate a second light source towards the environment;
  acquire at least one image of the environment while illuminated by the second light source; and
  change a direction of the housing based on content of the at least one image; and an image acquisition system operably coupled to the housing, the image acquisition system including:
  a first photosensitive array operably coupled to a first lens, the first lens having a first optical axis in a first direction, the first lens being configured to provide a first field of view greater than 180 degrees about the housing; and
  a second photosensitive array operably coupled to a second lens, the second lens having a second optical axis in a second direction, the second direction is opposite the first direction, the second lens being configured to provide a second field of view greater than 180 degrees about the housing,
  wherein the first field of view at least partially overlaps with the second field of view.

19. The device of claim 18, wherein the structure includes a payload portion and a yoke portion, the yoke portion being rotatably coupled to the housing to rotate about the first axis, the payload being rotatably coupled to the yoke portion to rotate about the second axis, the image acquisition system being coupled to the yoke portion.

20. The device of claim 19, further comprising:
  at least one processor operably coupled to the first light source, the absolute distance meter, the tracking system, the first camera, the first angular transducer, the second angular transducer, and the image acquisition system, the at least one processor being operable to identify at least one retroreflector device in images acquired by the image acquisition system and cause the rotation of the payload to emit the first light beam towards the at least one retroreflector device;
  a display operably coupled to the at least one processor, the display being configured to display the images;
  wherein the at least one processor are responsive to:
  cause the rotation of the payload in response to an operator selecting the at least one retroreflector on the display;
  detect a movement of the at least one retroreflector in the images and cause the rotation of the payload to direct the first light beam to follow the movement of the at least one retroreflector; and
  lock onto the at least one retroreflector in response to the at least one retroreflector being moved from a first position to a second position.

* * * * *